United States Patent [19]

Degnan et al.

[11] Patent Number: 5,554,274
[45] Date of Patent: Sep. 10, 1996

[54] MANUFACTURE OF IMPROVED CATALYST

[75] Inventors: Thomas F. Degnan, Moorestown; Donald J. Klocke, Somerdale, both of N.J.; Mae K. Rubin, Bala Cynwyd, Pa.

[73] Assignee: Mobil Oil Corporation, Fairfax, Va.

[21] Appl. No.: 325,838

[22] Filed: Oct. 19, 1994

Related U.S. Application Data

[63] Continuation-in-part of Ser. No. 988,992, Dec. 11, 1992, Pat. No. 5,369,071.

[51] Int. Cl.⁶ .................................................. C10G 47/02
[52] U.S. Cl. .......................... 208/111; 208/135; 208/264; 585/467; 585/475; 585/481
[58] Field of Search ...................... 585/467, 475, 585/481; 208/111, 135, 264

[56] References Cited

U.S. PATENT DOCUMENTS

| | | | |
|---|---|---|---|
| 3,758,403 | 9/1973 | Rosinski et al. | 208/120 |
| 4,016,218 | 4/1977 | Haag et al. | 260/671 |
| 4,097,543 | 6/1978 | Haag et al. | 260/672 |
| 4,159,282 | 6/1979 | Olson et al. | 585/481 |
| 4,582,815 | 4/1986 | Bowes | 502/64 |
| 4,851,604 | 7/1989 | Absil et al. | 585/475 |
| 4,899,011 | 2/1990 | Chu et al. | 585/481 |
| 5,082,984 | 1/1992 | Brown et al. | 585/481 |
| 5,157,185 | 10/1992 | Chu et al. | 585/467 |
| 5,173,461 | 12/1992 | Absil et al. | 502/62 |
| 5,290,427 | 3/1994 | Fletcher et al. | 208/89 |
| 5,308,471 | 5/1994 | Apelian et al. | 208/89 |
| 5,318,696 | 6/1994 | Kowalski | 208/120 |
| 5,326,463 | 7/1994 | Fletcher et al. | 208/89 |
| 5,369,071 | 11/1994 | Degnan et al. | 502/71 |

FOREIGN PATENT DOCUMENTS

WO94/13754  6/1994  WIPO.

*Primary Examiner*—Asok Pal
*Attorney, Agent, or Firm*—Ronald A. Bleeker; Malcolm D. Keen; Gerald L. Harris

[57] ABSTRACT

This invention relates the use of a catalyst composition having the structure of ZSM-5 and a matrix material, which has been manufactured by a new and useful method, for organic compound, e.g., hydrocarbon compound, conversion. The organic compound conversion processes described include catalytic cracking, gasoline hydrofinishing, toluene disproportionation, xylene isomerization, and ethylbenzene production.

16 Claims, No Drawings

MANUFACTURE OF IMPROVED CATALYST

CROSS-REFERENCE TO RELATED APPLICATIONS

This is a Continuation-in-part of U.S. application Ser. No. 07/988,992, filed Dec. 11, 1992, which is incorporated by reference, now U.S. Pat. No. 5,369,071.

BACKGROUND OF THE INVENTION

1. Field of the Invention

This invention relates to use of a new catalyst composition comprising a specially prepared crystalline molecular sieve having the structure of ZSM-5 and a matrix material as a catalyst component for organic compound, e.g., hydrocarbon compound, conversion.

More particularly, this invention relates to the use of a specially prepared catalyst composition comprising ZSM-5 crystals for organic compound, e.g., hydrocarbon compound, conversion, e.g., catalytic cracking, toluene disproportionation, gasoline hydrofinishing, ethylbenzene production, and xylene isomerization, wherein the ZSM-5 is synthesized in a special way to impart certain valuable physical properties and handling characteristics to catalyst comprising same.

2. Background of the Invention

Crystalline ZSM-5 and its conventional preparation are taught by U.S. Pat. No. 3,702,886, the entire disclosure of which is incorporated herein by reference. It has a distinctive X-ray diffraction pattern which distinguishes it from other known crystalline materials. A crystalline material composition having the structure of ZSM-5 is taught in U.S. Pat. Re. 29,948, the entire disclosure of which is incorporated herein by reference.

U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonium hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Lok et al. (3 Zeolites, 282–291 (1983)) teach numerous organic compounds which act as directing agents for synthesis of various crystalline materials, such as, for example, ZSM-5, ZSM-11, ZSM-12, ZSM-20, ZSM-35, ZSM-48, $ALPO_4$-5, $ALPO_4$-8, $ALPO_4$-20 and others.

Other publications teaching various organic directing agents for synthesis of crystalline ZSM-5 include, for example, U.S. Pat. No. 4,592,902, teaching use of an alkyltropinium directing agent, alkyl being of 2 to 5 carbon atoms; and U.S. Pat. No. 4,585,638, teaching use of diquaternary $(alkyl)_3N^+(CH_2)_6N^+(alkyl)_3$, alkyl being propyl or butyl.

SUMMARY OF THE INVENTION

A method is provided for organic compound, e.g., hydrocarbon, conversion using an improved catalyst composition comprising crystals having the structure of ZSM-5 exhibiting valuable catalytic activity and selectivity and other desirable properties. The method for preparing the improved catalyst composition comprises forming a special reaction mixture hydrogel, having a pH of from about 10 to about 14, preferably from about 11.5 to about 13.5, and containing sources of alkali or alkaline earth metal (M) cations; an oxide of trivalent element (X), e.g., aluminum, boron, iron, gallium, indium and mixtures thereof; an oxide of tetravalent element (Y), e.g., silicon, germanium, tin and mixtures thereof; n-propylamine directing agent (R); and water, said reaction mixture having a composition in terms of mole ratios, within the following ranges:

| Reactants | Useful | Preferred |
| --- | --- | --- |
| $YO_2/X_2O_3$ | <40 | 20 to 35 |
| $H_2O/YO_2$ | 10 to 35 | 10 to 30 |
| $OH^-/YO_2$ | 0.1 to 0.3 | 0.1 to 0.2 |
| $M/YO_2$ | 0.2 to 0.6 | 0.3 to 0.5 |
| $R/YO_2$ | 0.01 to 0.6 | 0.02 to 0.3 |

The catalyst preparation method further comprises maintaining the reaction mixture until crystals of the ZSM-5 structure are formed. Reaction conditions required consist of heating the foregoing reaction mixture to a temperature of from about 100° C. to about 200° C. for a period of time of from about 10 hours to about 100 hours. A more preferred temperature range is from about 130° C. to about 180° C. with the amount of time at a temperature in such range being from about 20 hours to about 60 hours. The solid product comprising ZSM-5 crystals is recovered from the reaction medium, as by cooling the whole to room temperature, filtering and water washing.

The next step of the method involves ammonium exchanging the recovered as-synthesized crystals such as by contact with, for example, ammonium nitrate, sulfate, and/or halide, e.g., chloride, solution. The exchanged crystals may then be washed with, for example, deionized water, and dried.

The ion-exchanged crystalline material is then deagglomerated. This may be accomplished, for example, by ball milling an aqueous slurry of the crystalline material.

The deagglomerated crystalline ZSM-5 material is then slurried, admixed or combined with a binder or matrix material such as, for example, silica, clay, and/or alumina, at a pH of from about 2 to about 12, preferably from about 4 to about 6, to yield a ZSM-5/matrix material comprising from about 5 to about 80 wt. % ZSM-5 and from about 20 to about 95 wt. % matrix.

The final ZSM-5/matrix slurry or mixture is then formed and/or dried, such as, for example, by spray drying to form a fluid powder, or by extrusion or by tableting.

This formed and/or dried ZSM-5/matrix catalyst material is then converted to the protonic form. This conversion may be accomplished by, for example, acid treatment, ammonium exchange, and/or calcination. If acid treatment or ammonium exchange is performed, calcination will follow.

Acid treatment for this purpose comprises, for example, contacting the formed and dried ZSM-5/matrix catalyst material with a 0.1 to about 1N mineral acid such as, for example, hydrochloric acid, or a carboxylic or dicarboxylic acid such as, for example, oxalic acid, at room temperature or a temperature up to about 150° C. for a time sufficient to provide the protonic form of the catalyst. The acid treated catalyst material may be washed with, for example, deionized water and again dried at a temperature of, for example, from about 65° C. to about 315° C.

Ammonium exchange for this purpose comprises, for example, contacting the dried ZSM-5/matrix catalyst material with ammonium nitrate, sulfate, hydroxide, and/or halide solution, washing the exchanged catalyst material with, for example, deionized water, and again drying the product catalyst material at a temperature of, for example, from about 65° C. to about 315° C.

The formed and dried ZSM-5/matrix catalyst material, whether acid treated or ammonium exchanged or not, is then calcined at a temperature of from about 200° C. to about 550° C. for from about 1 minute to about 48 hours. The calcined ZSM-5/matrix catalyst will have an Alpha Value of greater than about 30, usually from greater than about 30 to about 1200. A preferred calcination procedure in accordance herewith would be to provide a calcined product catalyst which retains a trace amount of carbon residue. Therefore, partial calcination within the above conditions, e.g., at lower temperature and/or shorter time, is preferred.

Optionally, the calcined catalyst material may be subjected to steaming in an atmosphere of from about 5 to about 100% steam for at least about 1 hour, e.g., from about 1 hour to about 200 hours, at a temperature of at least about 300° C., e.g., from about 300° C. to about 800° C. The resulting steamed catalyst will have an Alpha Value of greater than about 100 or more, less than 100, or even from about 1 to about 10. If the catalyst of this invention is to be used as an additive catalyst for hydrocarbon cracking, i.e., FCC or TCC, it is preferred not to steam it in accordance with this optional steaming step.

DETAILED DESCRIPTION

Catalyst Preparation

The reaction mixture required for synthesis of the ZSM-5 for use in this invention is X-rich, e.g., aluminum-rich, with a $YO_2/X_2O_3$ molar ratio of less than about 40, preferably from about 20/1 to about 35/1. Relative to other ZSM-5 synthesis methods, the reaction mixture used here also has a high pH, high $OH^-/YO_2$ molar ratio, high alkali or alkaline earth metal content and low water/$YO_2$ ratio. Also, the reaction time for crystallization is short by comparison.

It should be noted that the ratio of components of the reaction mixture required for synthesis of the ZSM-5 crystals for use herein is critical to achieve maximum effectiveness. For instance, if the $YO_2/X_2O_3$ ratio is greater than about 40, the product catalyst will be lower in activity. If the pH is allowed to drop below about 10 and crystallization reaction time is increased beyond about 100 hours, crystals form which do not provide all the benefits of the present catalyst.

The synthesis of the present invention is facilitated when the reaction mixture comprises seed crystals, such as those having the structure of ZSM-5. The use of at least 0.01%, preferably about 0.10%, and even more preferably about 1% seed crystals (based on total weight) of crystalline material will be useful.

The reaction mixture composition for the synthesis of ZSM-5 crystals can be prepared utilizing materials which supply the appropriate oxide. The useful sources of $X_2O_3$, e.g., aluminum oxide, iron oxide and/or boron oxide, include, as non-limiting examples, any known form of such oxide, e.g., aluminum oxide or hydroxide, organic or inorganic salt or compound, e.g., alumina, aluminates and borates. The useful sources of $YO_2$, e.g., silicon oxide, include, as non-limiting examples, known forms of such oxide, e.g., silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the ZSM-5 crystals will vary with the exact nature of the reaction mixture employed within the above limitations.

The ZSM-5 crystal composition prepared hereby has a characteristic X-ray diffraction pattern, including values substantially as set forth in Table 1, hereinafter.

TABLE 1

| Interplanar d-Spacing, (Å) | Relative Intensity ($I/I_o$) |
|---|---|
| 11.00 ± 0.25 | s–vs |
| 9.80 ± 0.30 | m–vs |
| 6.70 ± 0.10 | w |
| 6.30 ± 0.10 | w |
| 5.98 ± 0.10 | w |
| 5.55 ± 0.10 | w |
| 5.00 ± 0.10 | w |
| 4.36 ± 0.10 | w |
| 4.25 ± 0.08 | w |
| 4.08 ± 0.05 | w |
| 3.85 ± 0.07 | m–vs |
| 3.71 ± 0.05 | w–m |
| 3.62 ± 0.04 | w |
| 3.04 ± 0.03 | w |
| 2.99 ± 0.02 | w |

These X-ray diffraction data were collected with a Philips diffraction system, equipped with a graphite diffracted beam monochromator and scintillation counter, using copper K-alpha radiation. The diffraction data were recorded by step-scanning at 0.04 degrees of two-theta, where theta is the Bragg angle, and a counting time of 4 seconds for each step. The interplanar spacings, d's, were calculated in Angstrom units (Å), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline ZSM-5 material prepared hereby has a composition involving the molar relationship:

$$X_2O_3\text{:}(y)YO_2$$

wherein X is a trivalent element, such as aluminum, boron, iron, indium and/or gallium, preferably aluminum; Y is a tetravalent element, such as silicon, tin and/or germanium, preferably silicon; and y is less than about 30, usually from about 20 to less than about 30, more usually from about 23 to less than about 30. In the as-synthesized form, the crystalline material has a formula, on an anhydrous basis and in terms of moles of oxides per y moles of $YO_2$, as follows:

$$(x)M_2O\text{:}(0.2 \text{ to } 1.4)R_2O\text{:}X_2O_3\text{:}(y)YO_2$$

wherein X, Y, y, M, and R are as defined above and x is greater than 0.1, usually greater than about 0.3, most often from greater than about 0.4 to about 1.4. The M and R components are associated with the material as a result of their presence during crystallization, and may be reduced or removed by post-crystallization methods herein more particularly described.

The thermal decomposition product of the newly synthesized ZSM-5 can be prepared by heating, i.e., calcining, same at a temperature of from about 200° C. to about 550° C. for from 1 hour to about 48 hours in air or other inert gas.

Original ions, e.g., alkali or alkaline earth metal, of the as-synthesized ZSM-5 material and any found in the ZSM-5/matrix material can be replaced in accordance with techniques well known in the art, at least in part, by ion exchange with other ions. For the present catalyst composition, preferred replacing ions include hydrogen ions and hydrogen precursor, e.g., ammonium, ions. Typical ion exchange technique would be to contact the synthetic ZSM-5 material or ZSM-5/matrix material with a salt of the desired replacing ion or ions. Examples of such salts include the halides, e.g., chlorides, nitrates and sulfates. Representative ion exchange techniques are disclosed in a wide variety of patents including U.S. Pat. Nos. 3,140,249; 3,140,251; and 3,140,253.

Following contact with the salt solution of the desired replacing ion, the ZSM-5 or ZSM-5/matrix material is then preferably washed with water and dried at a temperature ranging from 65° C. to about 315° C. The final calcination of the catalyst product of this invention, i.e., following ion exchange of the ZSM-5/matrix material, will be in air or other inert gas at a temperature of from about 200° C. to about 550° C. for a time of from about 1 minute to about 48 hours or more. This final calcination is preferred to be partial so that trace amounts of carbon residue remain on the ZSM-5/matrix catalyst material.

The ZSM-5 crystals hereby prepared are incorporated with matrix material resistant to the temperatures and other conditions employed in certain organic conversion processes. Such matrix materials include inorganic materials such as clays, e.g., bentonite and/or kaolin, silica and/or metal oxides, e.g., alumina, titania and/or zirconia. The latter may be either naturally occurring or in the form of gelatinous precipitates, sols or gels including mixtures of silica and metal oxides. These matrix materials, i.e., clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the crystalline ZSM-5 material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the matrix material may be silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix material can be in the form of a cogel. A mixture of these components could also be used.

The relative proportions of finely divided crystalline ZSM-5 and matrix material vary widely with the crystalline material content ranging from about 5 to about 80 percent by weight, and more usually in the range of about 5 to about 50 percent by weight of the composite.

The calcined catalyst material of this invention may be contacted with steam to increase or to reduce the Alpha Value to within certain limits, e.g., an Alpha Value of 100 or greater, an Alpha Value of less than 100, or even an Alpha Value of from about 1 to about 10. Suitable steaming conditions include contact with 5–100% steam at a temperature of at least 300° C., e.g., 300°–800° C., for a time sufficient to obtain the required Alpha Value, usually at least 1 hour, e.g., 1–200 hours, at a pressure of 100–2,500 kPa. In a more particular embodiment, the catalyst can be made to undergo steaming with 75–100% steam at 315°–700° C., and atmospheric pressure for 2–25 hours. If the catalyst material of this invention is to be added to an FCC or TCC regenerator as additive catalyst, it is preferred that it not be steamed as indicated here.

The catalyst of this invention is easier to process than other similar catalysts and provides unique activity and selectivity in commercial applications, such as, for example, as an additive catalyst in catalytic cracking. As an additive catalyst in a hydrocarbon cracking process, the present catalyst leads to product rich in higher octane gasoline, alkylate, gasoline plus potential alkylate and lower olefins, with selectivity toward high quality propylene. Such a hydrocarbon cracking process uses a catalyst composition comprising a large-pore molecular sieve, such as, for example, REY or REUSY, and an additive catalyst comprising ZSM-5 having been synthesized and formulated in accordance with this invention to provide significantly improved product.

A catalyst composition which is particularly useful for xylene isomerization and toluene disproportionation comprises ZSM-5 prepared by the method described above which has been silica bound. This catalyst composition may further comprise a hydrogenation/dehydrogenation component.

The hydrogenation component may be a noble metal such as platinum, palladium, or another member of the platinum group, such as rhodium, with platinum being very useful. Other metals of Groups IB to VIII of the Periodic Table, such as nickel, copper, cobalt, molybdenum, rhodium, ruthenium, silver, gold, mercury, osmium, iron, zinc, cadmium, and mixtures thereof, may be utilized. Combinations of noble metals, such as platinum-rhenium, platinum-palladium, platinum-iridium, or platinum-iridium-rhenium, together with combinations with non-noble metals, e.g., of Groups of IVA, VA, VIA and VIIIA are of interest, e.g., with metals such as cobalt, nickel, vanadium, tungsten, titanium, and molybdenum, for example, platinum-tungsten, platinum-nickel, or platinum-nickel-tungsten. When the term "metal" is used herein, it is intended to include the elemental metal as well as the metal oxides, metal sulfides, and any other metal compounds.

The foregoing metals may be incorporated into the catalyst by any suitable method such as impregnation or exchange onto the zeolite. The metal may be incorporated in the form of a cationic, anionic or neutral complex such as $Pt(NH^3)_4^{2+}$ and cationic complexes of this type will be found convenient for exchanging metals onto the zeolite. For example, a platinum modified catalyst can be prepared by first adding the catalyst to a solution of ammonium nitrate in order to convert the catalyst to the ammonium form. The catalyst is subsequently contacted with an aqueous solution of tetraamine platinum(II) nitrate or tetraamine platinum(II) chloride. Anionic complexes such as the vanadate or metatungstate ions are also useful for impregnating metals into the zeolites. Incorporation is preferably undertaken in accordance with the invention of U.S. Pat. No. 4,312,790, incorporated by reference herein. After incorporation of the metal, the catalyst can then be filtered, washed with water and calcined at temperatures of from about 250° C. to about 500° C.

The amount of the hydrogenation-dehydrogenation component is suitably from about 0.001 to about 10 percent by weight, normally from about 0.1 to about 5 percent by weight, although this will, of course, vary with the nature of the component, less of the highly active noble metals, particularly platinum, being required than of the less active base metals.

Procedures for preparing silica bound ZSM-5 are described in U.S. Pat. Nos. 4,582,815; 5,053,374; and 5,182,242, incorporated by reference herein. A particular procedure for binding ZSM-5 with a silica binder involves an extrusion process.

A particular process for preparing silica bound ZSM-5 may comprise the steps of:

(a) mulling and then extruding a mixture comprising water, ZSM-5, colloidal silica and sodium ions under conditions sufficient to form an extrudate having an intermediate green strength sufficient to resist attrition during ion exchange step (b) set forth hereinafter;

(b) contacting the uncalcined extrudate of step (a) with an aqueous solution comprising ammonium cations under conditions sufficient to exchange cations in said ZSM-5 with ammonium cations;

(c) calcining the ammonium exchanged extrudate of step (b) under conditions sufficient to generate the hydrogen form of said ZSM-5 and increase the crush strength of said extrudate.

Another method of silica binding uses a suitable silicone resin, e.g., a high molecular weight, hydroxy functional silicone, such as Dow Corning Q6-2230 silicone resin in a method disclosed in U.S. Pat. No. 4,631,267, incorporated by reference herein. Other silicone resins that may be used in the method of this invention include those described in U.S. Pat. No. 3,090,691. When a silicone resin is used, a suitable polar, water soluble carrier, such as methanol, ethanol, isopropyl alcohol, N-methyl pyrrolidone or a dibasic ester may also be used along with water as needed. Dibasic esters that are useful in this invention include dimethyl glutarate, dimethyl succinate, dimethyl adipate, and mixtures thereof, one example of which is DuPont Chemical Co. DBE, which typically comprises about 50 to 75 percent dimethyl glutarate, 10 to 25 percent dimethyl adipate, 19 to 26 percent dimethyl succinate and less than about 0.2 wt. % methanol.

Extrusion aids may also be useful in the preparation of the catalysts of this invention. Methyl cellulose is a suitable extrustion aid, and one particular methyl cellulose that is effective as an extrusion aid in the method of this invention is a hydroxypropyl methyl cellulose, such as K75M Methocel™, available from Dow Chemical Co.

Organic Compound Conversion

The catalyst composition described above is useful for organic compound, e.g., hydrocarbon compound, conversion. Suitable organic conversion processes include catalytic cracking, toluene disproportionation, gasoline hydrofinishing, xylene isomerization, and ethylbenzene production. Each of these processes will be further described herein.

Catalytic Cracking

The catalyst composition for use in the cracking process may be prepared by combining a slurry of a large-pore molecular sieve, e.g., REY, and a slurry comprising matrix material. The combined slurries may be dewatered, reslurried, homogenized, and spray dried.

In the process for cracking a hydrocarbon feedstock, the feedstock is contacted under catalytic cracking conditions with a catalyst composition comprising a large-pore molecular sieve and the additive catalyst prepared by the present invention to yield the improved product.

It has been found that the use of a minor amount of the present improved additive catalyst along with cracking catalyst in a fluidized-bed cracking process leads to an unexpected shift in product composition as compared with the same process using the cracking catalyst alone or with a different additive catalyst. The yield shift results in gasoline of higher octane than without ZSM-5 as indicated by an increase in gasoline RON, MON, and an increase in gasoline plus potential alkylate RON. RON signifies the research octane number, MON signifies the motor octane number, and the terms are used to describe the knocking characteristics of gasoline, that is, its combustion behavior. The yield shift also results in an increase in $C_3$ and $C_4$ olefins, especially propylene, which are valuable to the refiner.

In catalytic cracking, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, alkylate and potential alkylate may result from the cracking process. This indirectly leads to product of increased octane because high octane, highly branched paraffinic gasoline blending stocks are synthesized from the alkylate and potential alkylate. Unlike cracking, alkylation makes larger branched hydrocarbons from smaller hydrocarbons and these larger branched hydrocarbons are inherently higher in octane.

The use of additive catalyst comprising the present improved catalyst in hydrocarbon cracking not only provides a high octane product and a boost in product alkylate and potential alkylate, but significantly more light olefins, especially propylene. The increase in propylene product at the expense of other olefins is an unexpected, very valuable occurrence. The propylene is high quality, petrochemical grade, and may be used for manufacture of valuable ethers and/or alcohols. In this process, the present improved catalyst provides comparable catalytic performance compared to the best of presently used FCC additive catalysts, except for a higher incremental selectivity to propylene. Further, the present improved additive catalyst provides catalyst usage improvements, such as ease of handling, loading, and processing, all found desirable by refiners.

The feedstock, that is, the hydrocarbons to be cracked in the process using the present improved catalyst, may include in whole or in part, a gas oil (e.g., light, medium, or heavy gas oil) having an initial boiling point above 204° C., a 50% point range of at least 260° C. and an end point range of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils with high metals contents can also be cracked using the improved catalyst of this invention.

Catalytic cracking units which are amenable to the process using the improved catalyst of the invention operate at temperatures from about 200° C. to about 870° C. and under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 450° C. to about 510° C.; catalyst/oil volume ratio of from about 2 to about 7; reactor space velocity of from about 1 to about 2.5 vol./hr./vol.; and recycle to fresh feed ratio of from 0 to about 0.5 (volume).

The catalyst prepared hereby is particularly applicable to Fluid Catalytic Cracking. In fluidized catalytic cracking processes, the catalyst is a fine powder of abut 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_3+$ and $C_2-$ fractions in the feed to the primary absorber. Primary absorber off-gas is directed to a secondary or sponge absorber, where a circulating stream of light cycle oil from the main column is used to absorb most of the remaining $C_5+$ material in the sponge absorber feed. Some $C_3$ and $C_4$ materials are also absorbed. The sponge-absorber rich oil is returned to the FCC main column. The sponge-absorber overhead, with most of the valuable $C_4+$ material removed but including $H_2S$, is sent to the fuel gas or other process streams. Liquid from the high pressure separator is sent to a stripper where most of the $C_2-$ is removed overhead and sent back to the high pressure separator. The bottoms liquid from the stripper is sent to the debutanizer, where an olefinic $C_3-C_4$ product is further separated for gasoline production. The debutanizer bottoms, that is, the stabilized gasoline, are sent to treating, if necessary, and then to storage. The $C_3$ and $C_4$ product olefins can be directed to an alkylation unit to produce a high octane gasoline by the reaction of an iso-paraffin (usually iso-butane) with one or more of the low molecular weight olefins (usually propylene and butylene).

The FCC conversion conditions include a riser top temperature of from about 500° C. to about 595° C., preferably from about 520° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

The cracking catalyst can contain any active component which has cracking activity. The active component may be a conventional large-pore molecular sieve including zeolite X (U.S. Pat. No. 2,882,442); REX; zeolite Y (U.S. Pat. No. 3,130,007); Ultrastable Y zeolite (USY) (U.S. Pat. No. 3,449,070); Rare Earth exchanged Y (REY) (U.S. Pat. No. 4,415,438); Rare Earth exchanged USY (REUSY); Dealuminated Y (DeAL Y) (U.S. Pat. No. 3,442,792; U.S. Pat. No. 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. Zeolite ZK-5 (U.S. Pat. No. 3,247,195); zeolite ZK-4 (U.S. Pat. No. 3,314,752); ZSM-20 (U.S. Pat. No. 3,972,983); zeolite Beta (U.S. Pat. No. 3,308,069); zeolite L (U.S. Pat. Nos. 3,216,789; and 4,701,315); and naturally occurring zeolites such as faujasite, mordenite and the like may also be used. These materials may be subjected to conventional treatments, such as impregnation or ion exchange with rare earths to increase stability. These patents are incorporated herein by reference. These large-pore molecular sieves have a pore opening of greater than about 7 Angstroms. In current commercial practice most cracking catalysts contain these large-pore molecular sieves. The preferred molecular sieve of those listed above is a zeolite Y, more preferably an REY, REUSY or a USY. Other large-pore crystalline molecular sieves include pillared silicates and/or clays; aluminophosphates, e.g., $ALPO_4$-5, $ALPO_4$-8, VPI-5; silicoaluminophosphates, e.g., SAPO-5, SAPO-37, SAPO-31, SAPO-40; and other metal aluminophosphates. These are variously described in U.S. Pat. Nos. 4,310,440; 4,440,871; 4,554,143; 4,567,029; 4,666,875; 4,742,033; 4,880,611; 4,859,314; and 4,791,083, each incorporated herein by reference.

It is conventional to use an additive catalyst with different properties along with the conventional catalyst to form an optional mixed catalyst system. Commercially used additives are shape-selective zeolites. Zeolite having a Constraint Index of 1–12 can be used for this purpose. Details of the Constraint Index test are provided in *J. Catalysis*, 67, 218–222 (1981) and in U.S. Pat. No. 4,711,710 both of which are incorporated herein by reference.

Conventional shape-selective zeolites useful for this purpose are exemplified by intermediate pore (e.g., less than about 7 Angstroms pore size, such as from about 5 to less than about 7 Angstroms) zeolites ZSM-5 (U.S. Pat. No. 3,702,886 and Re. 29,948); ZSM-11 (U.S. Pat. No. 3,709,979); ZSM-12 (U.S. Pat. No. 4,832,449); ZSM-22 (U.S. Pat. No. 4,556,477); ZSM-23 (U.S. Pat. No. 4,076,842); ZSM-35 (U.S. Pat. No. 4,016,245); ZSM-48 (U.S. Pat. No. 4,397,827); ZSM-57 (U.S. Pat. No. 4,046,685); PSH-3 (U.S. Pat. No. 4,439,409); and MCM-22 (U.S. Pat. No. 4,954,325) either alone or in combination. In addition, the catalyst composition may include metals useful in promoting the oxidation of carbon monoxide to carbon dioxide under regenerator conditions as described in U.S. Pat. No. 4,350,614.

As will be demonstrated hereinafter, use of the present improved catalyst as the additive catalyst in the above-detailed cracking process provides unexpected improvements relative to use of conventional, yet similar, catalysts.

Toluene Disproportionation

Catalysts prepared according to the above described methods are useful in vapor phase toluene disproportionation. Toluene disproportion processes are variously described in U.S. Pat. Nos. 4,052,476; 4,097,543; 4,117,026; 4,851,604; and 5,173,461, each of which is incorporated by reference herein.

Typical vapor phase toluene disproportionation conditions comprise a temperature of about 500° to about 1400° F., e.g., about 600° to about 1,100° F., e.g., about 800° to about 1,025° F., e.g., about 825° to about 1,000° F.; a pressure of about 0.1 to about 100 atm, e.g., about 1 to about 100 atm, e.g., about 1 to about 70 atm; a weight hourly space velocity (WHSV) of about 0.1 to about 50 $hr^{-1}$, e.g., about 0.5 to about 50 $hr^{-1}$, e.g., about 1 to about 50 $hr^{-1}$, e.g., about 0.1 to about 30 $hr^{-1}$, e.g., about 1 to about 30 $hr^{-1}$; and a hydrogen to hydrocarbon molar ratio of about 0 to about 20, e.g., about 0 to about 10, e.g. about 0 to about 4, e.g., about 1 to about 10.

Operating conditions employed for toluene disproportionation, such as temperature, pressure, space velocity, molar ratio of the reactants and hydrogen to hydrocarbon mole ratio will effect the yields from the process.

Toluene disproportionation according to this invention is conducted such that disproportionation of toluene is carried out in the vapor-phase by contact in a reaction zone, such as, for example, a fixed-bed of catalyst, under conditions effective for disproportionation, said catalyst being prepared according to the above described method, said catalyst typically having been hydrogen, hydrogen precursor, and/or non-noble Group VIII (e.g., Fe, Co, Ni) metal exchanged and/or thermally treated. The effluent from the reaction zone is separated and distilled to remove desired product, such as benzene and xylene, and unreacted material, i.e. toluene, is recycled for further reaction. The catalyst is typically silica bound.

By the present improved process, toluene is converted to aromatic concentrates of high value, e.g., xylene and benzene. This process may be conducted in either batch or fluid bed operation with attendant benefits of either operation readily obtainable.

In the process of this invention, the toluene charge is typically dried in a manner which will minimize the water entering the reaction zone. Means known in the art suitable for drying the toluene charge to the present process are numerous, including percolation through silica gel, activated alumina, molecular sieves or other suitable substance or use of liquid charge dryers.

In a typical embodiment of the present process, optimum toluene conversion is typically found to be greater than about 40 weight percent, e.g., from about 40 weight percent to about 50 weight percent. Yield of $C_5^-$ products and ring losses in such an embodiment appear to increase at conversion levels above about 40 percent and xylene yields begin to decrease when toluene conversion exceeds about 50 weight percent. Through the use of the process of the present invention, para-xylene concentrations in the product may frequently exceed the thermodynamic equilibrium value.

Considering vapor-phase disproportionation of toluene, the first stage feed is typically heated to a temperature of about 600° F. to about 1,100° F., e.g., about 650° F. to about 1,000° F., at a pressure of about atmospheric to about 1000 psig, e.g., about 50 psig to about 1,000 psig. The hydrogen to hydrocarbon mole ratio may be from 0 (no added hydrogen) to about 20, e.g., from about 0 to about 10, e.g., from about 0 to about 3, e.g., from about 0 to about 2.

Gasoline Hydrofinishing

Catalysts prepared according to the method described above are useful for octane enhancement in gasoline hydrofinishing. Processes using zeolitic materials for octane enhancement in gasoline hydrofinishing are described in U.S. Pat. Nos. 5,326,463; 5,308,471; and 5,290,427, each of which is incorporated by reference herein.

Gasoline hydrofinishing is typically used for removal of sulfur from sulfur-containing gasoline blendstocks, particularly gasoline blendstocks produced from fluid catalytic cracking (FCC) processes, as described above. All or part of the FCC gasoline product, e.g., the higher boiling or heavier portion of the FCC gasoline, may be treated in the gasoline hydrofinishing process to produce a gasoline blendstock having a lower total sulfur content than the feed. Typical gasoline hydrofinishing processes comprise contacting the unfinished gasoline (gasoline blendstock) with a hydrodesulfurization catalyst to convert sulfur compounds present in the gasoline to hydrogen sulfide, which may be readily removed from the gasoline, however, hydrotreating gasoline tends to saturate olefins and diolefins, thus reducing the octane of the gasoline. A recent improvement in gasoline hydrofinishing is the use of a second bed of catalyst following the hydrodesulfurization catalyst to partially crack the hydrotreated gasoline and thus to increase the octane of the material. A catalyst prepared according to the method described above is particularly useful in the second bed of the above described gasoline hydrofinishing process to increase the octane of the hydrotreated material. The feedstock may be passed over both beds of catalyst with or without interstage separation of light ends and cracked material from the heavy ends (gasoline boiling range material).

Typical hydrotreating conditions and octane enhancement for gasoline hydrofinishing include a temperature of from about 400° to about 850° F., e.g., about 500° to about 800° F.; a total system pressure at the reactor inlet of from about 50 to 1,500 psig, e.g., about 300 to about 1,000 psig; a liquid hourly space velocity (LHSV) of from about 0.5 to about 10 $hr^{-1}$; e.g., about 1 to about 6 $hr^{-1}$; and a hydrogen to hydrocarbon ratio of from about 500 to about 5,000 standard cubic feet of hydrogen per barrel of hydrocarbon feed (SCF/bbl); e.g., 1,000 to about 2,500 SCF/bbl. The hydrotreating reaction is exothermic and a typical temperature rise is about 20° to about 200° F. The hydrotreating catalyst is typically a Group VI metal, e.g., molybdenum or tungsten, and/or a Group VIII metal, e.g., nickel or cobalt, on a suitable substrate or support, e.g., alumina or silica-alumina. Combinations of the above metals are commonly used, e.g., nickel is frequently combined with molybdenum and cobalt is frequently combined with molybdenum. The above described operating conditions, when used with an hydrodesulfurization catalyst and a zeolite prepared by the method of this invention are effective to produce a treated gasoline blendstock having a lower total sulfur content than the unfinished gasoline feedstock and an octane level higher than that of the gasoline boiling range material in the product after treatment with the hydrodesulfurization catalyst alone. Further, when using a zeolite prepared by the method of this invention, the volume of gasoline blendstock that is cracked to lighter products, and hence lost, in the octane enhancement step, is reduced over prior art processes.

Xylene Isomerization

Catalysts prepared according to the methods described above are useful for xylene isomerization. Processes for xylene isomerization are described in U.S. Pat. Nos. 5,082,984; 4,899,011; 4,709,110; 4,665,255; 4,658,075; 4,159,282; and Re. 31,782, each incorporated by reference herein.

Xylene isomerization is a process for the conversion of a aromatic $C_8$ mixture of ethylbenzene and xylenes, wherein the para-xylene concentration is less than at thermal equilibrium, e.g., a feedstock comprising about 5 to 60 wt. % ethylbenzene, 0 to 35 wt. % ortho-xylene, 20–95 wt. % meta-xylene, 0 to 15 wt. % para-xylene, and possibly 0 to 20 wt. % paraffins, to an equilibrium mixture of the above aromatic compounds, thus allowing increased production of the desirable products, para-xylene and, optionally, ortho-xylene. Catalysts prepared by the method described above are useful in xylene isomerization, particularly when the catalyst has been silica bound.

Typical operating conditions for xylene isomerization include a temperature of about 400° to about 1,000° F., e.g., about 500° to about 950° F., e.g., about 750° to about 950° F.; a pressure of about 0 to 1,500 psig, e.g., about 0 to about 1,000 psig, e.g., about 25 to 1,000 psig, e.g., about 50 to about 400 psig; a weight hourly space velocity based upon total amount of catalyst and support of about 0.5 to about 100 $hr^{-1}$, e.g., about 3 to about 50 $hr^{-1}$; and a hydrogen to hydrocarbon molar ratio of about 0 to about 10, e.g., about 0.5 to about 10, e.g., about 1 to about 5. These operating conditions include operating the isomerization reactor with liquid phase feed, vapor phase feed, or mixed-phase feed.

The ZSM-5 catalysts described above, which are prepared according to the method of this invention, are useful in xylene isomerization systems. The zeolite in the catalyst may also be associated with a hydrogenation-dehydrogenation component as has been previously described.

Ethylbenzene Production

Catalysts prepared according to the method described above are useful for the production of ethylbenzene, e.g., through the alkylation of benzene with ethylene. According to the method of this aspect of the invention, ethylbenzene is produced by the alkylation of benzene using ethylene in the presence of an alkylation catalyst which comprises ZSM-5 prepared by the method described above. Ethylbenzene production processes are described in U.S. Pat. Nos. 3,451,504; 4,016,218; 4,547,605; 5,157,185; and 5,334,795, each incorporated by reference herein.

This process can be carried out at high ethylene conversion levels to produce an ethylbenzene product with low amounts of impurities such as xylenes, cumene, butylbenzene, and heavy aromatic residues including the more highly alkylated benzenes. The alkylation reaction is typically carried out at elevated temperatures in the vapor phase. Suitable reaction conditions can be selected by reference to the phase diagram for benzene. In the vapor phase reaction, the conditions are selected to maintain the benzene in the vapor phase, for example, with a reactor inlet temperature which is above the temperature required to maintain the benzene in the vapor phase at the selected pressure, with a preferred maximum of about 900° F. Because the reaction is exothermic, the reactor bed temperature will be higher than the reactor inlet temperature, typically by as much as 100° F., or even 150° F., or even 250° F.

While reaction temperatures will typically be about 300° F. to about 900° F., it should be recognized that a number of temperatures within this range will be attractive, depending upon the operating mode and upon the desired product slate. Examples of vapor phase temperatures include greater than about 500° F., e.g., about 575° to about 900° F., e.g., about 600° to about 900° F., e.g., about 650° to about 900° F., e.g., about 700° to about 850° F. Within the above described temperature range, the yield of ethylbenzene and xylene typically increases with increasing temperature, while the yield of various polyethylbenzenes, such as diethylbenzene, and other byproducts decreases with increasing temperature.

Reaction pressures typically are between atmospheric and about 3,000 psig, e.g., less than about 1,000 psig, e.g. between about 25 and about 450 psig, e.g., about 50 or 100 psig. The reaction is typically carried out in the absence of hydrogen, and therefore the pressures given are those of the reactant species. Vapor phase reactions typically are conducted at pressures of about 50 to about 500 psig, e.g., about 200 to about 500 psig.

The space velocity is typically from about 0.1 to about 10 $hr^{-1}$ weight hourly space velocity, based upon the ethylene feed and the zeolite component of the catalyst. The higher space velocities, e.g., about 1 to about 10 $hr^{-1}$, e.g., about 1 to about 6 $hr^{-1}$, are suitable for vapor phase reactions.

The molar ratio of benzene to ethylene in the fresh feed to the alkylation reactor is typically from about 1:1 to about 30:1, e.g., about 5:1 to about 20:1, e.g., about 5:1 to about 10:1 (benzene to ethylene), although the ratio in the reactors may be higher as a result of benzene recycle, with ratios above 30:1 being common, e.g., about 30:1 to about 50:1.

In order to more fully illustrate the nature of the invention and the manner of practicing same, the following examples are presented. In the examples, whenever adsorption data are set forth for comparison of sorptive capacities for water, cyclohexane and n-hexane, they are determined as follows:

A weighed sample of the calcined adsorbant is contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure is kept constant (within about ±0.5 mm) by addition of absorbate vapor controlled by a manostat during the adsorption period, which does not exceed about 8 hours. As adsorbate is adsorbed by the sorbant material, the decrease in pressure causes the manostat to open a valve which admits more adsorbate vapor to the chamber to restore the above control pressures. Sorption is complete when the pressure change is not sufficient to activate the manostat. The increase in weight is calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 $sec^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395.

EXAMPLE 1

A solution containing 1.53 parts 50% NaOH solution in 1.89 parts $H_2O$ was added to a solution containing 1 part $Al_2(SO_4)_3 \cdot xH_2O$ 17.2% $Al_2O_3$) in 7.63 parts $H_2O$. To this mixture was added 3.38 parts Ultrasil (VN3SP) precipitated silica and 0.09 part ZSM-5 seeds followed by 0.39 part n-propylamine. The Ultrasil used is a precipitated, spray-dried silica manufactured by DeGussa Corporation containing about 90 wt. % $SiO_2$. The mixture was stirred until uniform. The reaction mixture had the following composition in mole ratios:

| | |
|---|---|
| $SiO_2/Al_2O_3 =$ | 30.0 |
| $OH^-/SiO_2 =$ | 0.18 |
| $R/SiO_2 =$ | 0.13 |
| $H_2O/SiO_2 =$ | 13.3 |
| $Na^+/SiO_2 =$ | 0.38 |
| * solids = | 18.0 | where R=n-propylamine.

The mixture was crystallized in a stirred reactor at 160° C. for 26 hours. The crystals were filtered, washed with water, and dried at 120° C. A portion of the product was submitted for X-ray analysis and identified as having the structure of ZSM-5.

The chemical composition of the product crystalline material was, in wt. %:

| | |
|---|---|
| N = | 1.3 |
| Na = | 1.2 |
| $Al_2O_3 =$ | 5.5 |
| $SiO_2 =$ | 72.3 |
| Ash (1000° C.) = | 88.4 |
| $SiO_2/Al_2O_3$, molar = | 22.3 |
| Carbon = | 4.2 |

The sorption capacities and surface area, after calcining the product crystalline material for 16 hours at 538° C., were determined to be:

| | |
|---|---|
| Cyclohexane, 40 Torr, wt. % = | 7.6 |
| n-Hexane, 40 Torr, wt. % = | 11.4 |
| $H_2O$, 12 Torr, wt. % = | 9.2 |
| Surface Area, $m^2/g =$ | 286 |

SEM analysis of the product material revealed a polycrystalline solid showing crystal facets of ZSM-5.

A calcined (3 hours at 538° C. in air) portion of the product of this example was ammonium exchanged with 10% $NH_4Cl$ solution to a sodium level of 34 ppm and calcined again to obtain the hydrogen form. The Alpha Value of this material was 1200.

EXAMPLE 2

For comparison purposes, ZSM-5 crystals used commercially for additive catalyst were synthesized. In that synthesis, a solution containing 1.28 parts 50% NaOH solution in 8.49 parts $H_2O$ was added to a solution containing 1 part $Al_2(SO_4)_3 \cdot xH_2O$ 47% solution (8.1 wt. % $Al_2O_3$). To this mixture was added 5.24 parts Ultrasil (VN3SP) precipitated silica, 0.04 part ZSM-5 seeds, 0.008 part Daxad-23, and 0.72 part 26% brine solution, followed by 0.46 part n-propylamine. The mixture was stirred until uniform. The reaction mixture had the following composition in mole ratios:

| | |
|---|---|
| $SiO_2/Al_2O_3 =$ | 78.2 |
| $OH^-/SiO_2 =$ | 0.07 |
| $R/SiO_2 =$ | 0.10 |
| $H_2O/SiO_2 =$ | 6.8 |
| $Na^+/SiO_2 =$ | 0.26 |
| % solids = | 28.4 | where R=n-propylamine.

The mixture was crystallized in a stirred reactor at 149° C. for 7 hours. The crystals were filtered, washed with water, and dried at 120° C. A portion of the product was submitted for X-ray analysis and identified as having the structure of ZSM-5.

The chemical composition of the product crystalline material was, in wt. %:

| | |
|---|---|
| Na | <0.5 |
| $Al_2O_3$ | 5.3 |
| $SiO_2$ | 83.7 |
| Ash (1000° C.) | 89 |
| $SiO_2/Al_2O_3$, molar = | 55 |

The surface area of this material was determined to be 340 $m^2/g$.

A calcined portion of the product of this example was ammonium exchanged with 1N $NH_4NO_3$ to a sodium level of 121 ppm. The Alpha Value of this material was 800.

EXAMPLE 3

Again for comparison purposes, another ZSM-5 material used commercially for additive catalyst was synthesized. In that synthesis, a solution containing 1.54 parts 50% NaOH solution was added to a solution containing 1 part $Al_2(SO_4)_3 \cdot xH_2O$ (17.2% $Al_2O_3$) in 10.1 parts $H_2O$. To this mixture was added 3.43 parts Ultrasil (VN3SP) precipitated silica. The mixture was stirred until uniform. The reaction mixture had the following composition in mole ratios:

| | |
|---|---|
| $SiO_2/Al_2O_3 =$ | 32.7 |
| $OH^-/SiO_2 =$ | 0.17 |
| $R/SiO_2 =$ | 0 |
| $H_2O/SiO_2 =$ | 11.0 |
| $Na^+/SiO_2 =$ | 0.35 |
| % solids = | 21.0 |

The mixture was crystallized in a stirred reactor at 160° C. for about 24 hours. The crystals were filtered, washed with water, and dried at 120° C. A portion of the product was submitted for X-ray analysis and identified as having the structure of ZSM-5.

The chemical composition of the product crystalline material was:

| | |
|---|---|
| Na | 1358 ppm |
| $Al_2O_3$ | 10.4 wt. % |
| $SiO_2$ | 84.7 wt. % |
| Ash (1000° C.) | 95.1 wt. % |
| Carbon | 0 |
| $SiO_2/Al_2O_3$, molar = | 26 |

The surface area of the product material was determined to be 340 $m^2/g$.

A portion of the product of this example was ammonium exchanged with 1N $NH_4NO_3$ to a sodium level of 656 ppm. The Alpha Value of this material was 1361.

EXAMPLE 4

Another ZSM-5 material useful for commercial additive catalyst was synthesized for comparison purposes. A solution containing 0.72 part 50% NaOH solution in 4.15 parts $H_2O$ was added to a solution containing 1 part $Al_2(SO_4)_3 \cdot xH_2O$ 47% solution (8.1% $Al_2O_3$). To this mixture was added 1.63 parts HiSil-233 precipitated hydrated silica manufactured by PPG Industries containing about 87 wt. % $SiO_2$, about 6 wt. % free $H_2O$, and about 4.5 wt. % bound $H_2O$ of hydration. The mixture was stirred until uniform. The reaction mixture had the following composition in mole ratios:

| | |
|---|---|
| $SiO_2/Al_2O_3 =$ | 27.0 |
| $OH^-/SiO_2 =$ | 0.18 |
| $R/SiO_2 =$ | 0 |
| $H_2O/SiO_2 =$ | 10.0 |
| $Na^+/SiO_2 =$ | 0.40 |
| * solids = | 26.7 |

The mixture was crystallized in a stirred reactor at 160° C. for 46 hours. The crystals were filtered, washed with water, and dried at 120° C. A portion of the product was submitted for X-ray analysis and identified as having the structure of ZSM-5.

The chemical composition of the product crystalline material was, in wt. %:

| | |
|---|---|
| Na | 2.6 |
| $Al_2O_3$ | 6.2 |
| $SiO_2$ | 83.6 |
| Ash (1000° C.) | 92.5 |
| $SiO_2/Al_2O_3$, molar = | 26 |

The surface area of this material was determined to be 299 $m^2/g$.

A portion of the product of this example was ammonium exchanged with 1N $NH_4NO_3$ to a sodium level of 384 ppm. The Alpha Value of this material was 850.

EXAMPLES 5–11

Additional examples of synthesis of the particular ZSM-5 crystals needed for this invention were carried out with the reaction mixture, crystallization, and product details presented in Table 2 below. Reaction mixture composition is given in molar ratios. Adsorption and surface area data were obtained on material having been calcined at 538° C. as in Examples 1–4. Alpha Values were obtained, as in Examples 1–4, for the hydrogen forms of the crystalline materials.

TABLE 2

| | Example | | | | | | |
|---|---|---|---|---|---|---|---|
| | 5 | 6 | 7 | 8 | 9 | 10 | 11 |
| Reaction Mixture | | | | | | | |
| $SiO_2/Al_2O_3$ | 30.0 | 30.0 | 30.0 | 30.0 | 30.0 | 30.0 | 30.0 |
| $OH^-/SiO_2$ | 0.18 | 0.18 | 0.18 | 0.18 | 0.18 | 0.18 | 0.18 |
| $R/SiO_2$ | 0.13 | 0.13 | 0.13 | 0.02 | 0.13 | 0.13 | 0.04 |
| $H_2O/SiO_2$ | 20.0 | 14.7 | 14.7 | 11.5 | 20.0 | 11.3 | 11.5 |
| $Na^+/SiO_2$ | 0.3 | 0.38 | 0.38 | 0.38 | 0.38 | 0.38 | 0.38 |
| Seeds | No | Yes | Yes | Yes | No | Yes | Yes |
| Crystallization | | | | | | | |
| Temp, °C. | 175 | 175 | 175 | 175 | 175 | 160 | 160 |
| Time, hrs. | 48 | 48 | 48 | 48 | 24 | 23 | 27 |
| Crystallinity, % | 100 | 110 | 85 | 95 | 105 | 95 | 90 |
| Composition | | | | | | | |
| N, wt. % | 1.90 | 2.05 | 1.85 | 0.30 | 1.4 | 1.3 | 0.75 |

TABLE 2-continued

| | Example | | | | | | |
|---|---|---|---|---|---|---|---|
| | 5 | 6 | 7 | 8 | 9 | 10 | 11 |
| Na, wt. % | 0.14 | 0.19 | 0.37 | 2.3 | 0.85 | 1.4 | 1.2 |
| $SiO_2/Al_2O_3$ | 24.7 | 20.3 | 28.2 | 25.3 | 25.0 | 24.6 | 24.5 |
| Adsorption, % | | | | | | | |
| Cyclohexane | 7.6 | 6.8 | 6.9 | 4.9 | 6.5 | 6.7 | 7.1 |
| n-Hexane | 12.1 | 12.2 | 11.0 | 9.1 | 10.9 | 10.0 | 9.0 |
| $H_2O$ | 11.0 | 10.1 | 8.7 | 9.6 | 9.5 | 9.2 | 8.9 |
| Surface Area, $m^2/g$ | 323 | 328 | 306 | 218 | 279 | 267 | 262 |
| Alpha Value | 1373 | 949 | 1488 | — | — | 953 | 1131 |

EXAMPLE 12

Catalysts were prepared using the products of Examples 1, 2, 3, and 4. An additional catalyst was prepared using the product of a repeat of Example 3 (hereinafter 3') except that the initial sodium content of the synthesis product was 2.7 wt. %, and the product of ammonium exchange with 1N $NH_4NO_3$ had a sodium level of 0.15 wt. %. As-synthesized portions of the zeolite products were ammonium exchanged with 1N $NH_4NO_3$, washed with deionized water, and dried at 120° C. to form drycake. A 30 wt. % solids slurry of each drycake was ball-milled to reduce mean particle size in each instance to about 2.3–3.6 μm.

The milled slurries were combined with silica-alumina and clay matrix to form 25 wt. % ZSM-5 fluid catalysts. The matrix in each case contained 35 wt. % Kaopaque 10S kaolin clay and 65 wt. % silica-alumina gel. The gel contained 93 wt. % silica from Q-Brand sodium silicate and 7 wt. % alumina from aluminum sulfate. The gel was formed at 10° to 13° C. at 8.6 wt. % solids. Sixty-five percent of the sodium in the sodium silicate was neutralized with sulfuric acid added to the slurries.

After spray drying at an average outlet temperature of 179° C., the catalysts were ammonium exchanged by contact with 1N $NH_4OH$ at room temperature for 6 hours to remove sodium introduced by the matrix.

Small portions of each catalyst were calcined in a muffle furnace in air at 538° C. for 2 hours to obtain samples which were submitted for determination of analytical properties and Alpha Values. The remainder of each catalyst was steamed for 10 hours at 788° C. with 45% steam and 55% air at atmospheric pressure. Samples of the steamed catalysts were also submitted for determination of analytical properties and Alpha Values. Results of these tests are presented in Table 3.

TABLE 3

| Comparison of Catalyst Properties | | | | | |
|---|---|---|---|---|---|
| Zeolite Example | 1 | 2 | 3 | 3' | 4 |
| | Calcined Catalyst | | | | |
| Sodium, ppm | 57 | 128 | 93 | 170 | 131 |
| Sorptions, g/100 g | | | | | |
| Water | 11.3 | NA | 6.6 | NA | 8.2 |
| n-$C_6$ | 8.5 | NA | 10.2 | NA | 9.7 |
| cy-$C_6$ | 8.2 | NA | 9.6 | NA | 9.3 |
| Real Density, g/cc | 2.26 | 2.36 | 2.36 | NA | 2.37 |
| Particle Density, g/cc | 1.29 | 1.18 | 1.15 | NA | 1.11 |
| Pore Volume, cc/g | 0.33 | 0.43 | 0.44 | NA | 0.48 |

TABLE 3-continued

| Comparison of Catalyst Properties | | | | | |
|---|---|---|---|---|---|
| Zeolite Example | 1 | 2 | 3 | 3' | 4 |
| Surface Area, $m^2/g$ | 263 | 298 | 273 | NA | 275 |
| Alpha Value | 303 | 85 | 140 | NA | 53 |
| | Steamed Catalyst | | | | |
| Sorptions, g/100 g | | | | | |
| Water | 1.4 | NA | NA | NA | 1.2 |
| n-$C_6$ | 2.9 | NA | 2.7 | NA | 2.6 |
| cy-$C_6$ | 3.5 | NA | 3.3 | NA | 2.9 |
| Real Density, g/cc | 2.36 | NA | 2.37 | NA | 2.37 |
| Particle Density, g/cc | 1.44 | NA | 1.29 | NA | 1.23 |
| Pore Volume, cc/g | 0.27 | NA | 0.35 | NA | 0.39 |
| Surface Area, $m^2/g$ | 73 | NA | 98 | NA | 84 |
| Alpha Value | 3 | NA | 3 | 2 | 3 |

EXAMPLE 13

Cracking catalyst blends were prepared by mixing a commercial cracking catalyst composed of 15 wt. % REY and 85 wt. % silica-based matrix with each of the additive catalysts prepared in Example 12. Catalysts A and E are samples of the present invention Catalysts B, C, C', D F, G, H, and I are commercial formulations. Catalyst I was made using as additive catalyst a commercially available material comprising 25 wt. % ZSM-5 as prepared in Example 2. Catalyst I was steamed 10 hours at 788° C. with 100% steam at 6 psig. The mixed catalysts were as follows:

| Catalyst | Wt. % Additive | Wt. % ZSM-5 | From Example |
|---|---|---|---|
| A | 8 | 2 | 1 |
| B | 8 | 2 | 2 |
| C' | 8 | 2 | 3 |
| C | 8 | 2 | 3' |
| D | 8 | 2 | 4 |
| E | 2 | 0.5 | 1 |
| F | 2 | 0.5 | 2 |
| G | 2 | 0.5 | 3 |
| H | 2 | 0.5 | 4 |
| I | 2 | 0.5 | Commercial |

EXAMPLE 14

The commercial REY cracking catalyst used in Example 13 and additive catalyst/cracking catalyst mixtures prepared in Example 13 were evaluated in a fixed-fluidized bed cracking unit with Joliet Sour Heavy Gas Oil feedstock at 515° C. and 1 minute on stream. The catalyst/oil ratios of the tests were varied through a range of from 3 to 6 to provide a range of conversions. Results of these tests at 70% conversion are presented in Table 4 for the REY catalyst and Catalysts A, C, and D. Table 6 presents the test results for the REY catalyst and Catalysts E and I. Tables 5 and 7 present selectivity and activity comparisons between the catalysts.

The results of these tests indicate that the additive catalyst comprising the catalyst composition of the present invention produces more alkylate and gasoline plus potential alkylate, and more propylene than the other additive catalysts.

TABLE 4

(70 vol. % Conversion)

| | | Δ | | |
|---|---|---|---|---|
| Catalyst | REY | C | D | A |
| $C_5$+ Gasoline, vol. % | 52.4 | (4.0) | (4.4) | (6.2) |
| $C_4$s, vol. % | 14.4 | 2.4 | 3.0 | 0.6 |
| $C_3$s, vol. % | 10.4 | 1.4 | 1.5 | 5.0 |
| $C_2$−, wt. % | 3.3 | (0.2) | (0.4) | 0.5 |
| Coke, wt. % | 7.1 | 0.9 | 1.1 | 0.5 |
| Alkylate, vol. % | 20.8 | 5.4 | 4.9 | 8.0 |
| G+PA, vol. % | 73.2 | 1.4 | 0.5 | 1.8 |
| n-$C_5$, vol. % | 0.4 | (0.1) | (0.1) | (0.1) |
| i-$C_5$, vol. % | 6.6 | 0.1 | 0.6 | (1.2) |
| $C_5$=, vol. % | 3.8 | 0.1 | — | (0.3) |
| n-$C_4$, vol. % | 0.8 | 0.4 | 0.4 | 0.3 |
| i-$C_4$, vol. % | 8.2 | 0.4 | 1.1 | (0.2) |
| $C_4$=, vol.% | 5.5 | 1.6 | 1.4 | 0.5 |
| $C_3$°, vol. % | 3.4 | (0.3) | (0.1) | 0.5 |
| $C_3$=, vol. % | 7.1 | 1.6 | 1.4 | 4.0 |
| $C_2$, wt. % | 0.6 | 0.1 | 0.1 | 0.2 |
| $C_2$=, wt. % | 0.8 | (0.1) | (0.2) | 0.1 |
| $C_1$, wt. % | 0.8 | — | — | — |
| $H_2$, wt. % | 0.2 | (0.1) | — | — |
| $H_2S$, wt. % | 0.9 | — | (0.3) | 0.3 |
| Octane, $C_5$+ Gasoline | 91.4 | 0.8 | 1.0 | 0.9 |

TABLE 5

(70 vol. % Conversion)

| Catalyst | C | D | A |
|---|---|---|---|
| Selectivity | | | |
| (− Δ $C_5$+ Gasoline/Δ RON) | 5.0 | 4.4 | 6.9 |
| (− Δ $C_5$+ Gasoline/Δ PA) | 0.7 | 0.9 | 0.8 |
| $C_3$=/$C_4$= (vol. %/vol. %) | 1.2 | 1.2 | 1.9 |
| Δ $C_3$=/Δ $C_4$= (vol. %/vol. %) | 1.0 | 1.0 | 8.0 |
| $C_3$=/$C_3$° (vol. %/vol. %) | 2.8 | 2.6 | 2.9 |
| $C_3$=/Δ ($C_3$= + $C_3$°) | 1.2 | 1.1 | 0.9 |
| Activity | | | |
| (Δ RON/wt. % ZSM-5) | 0.4 | 0.5 | 0.5 |
| (Δ PA/wt. % ZSM-5) | 2.8 | 2.5 | 4.0 |

TABLE 6

(70 vol. % Conversion)

| | | Δ | |
|---|---|---|---|
| Catalyst | REY | I | E |
| $C_5$+ Gasoline, vol. % | 52.4 | (2.1) | (3.2) |
| $C_4$s, vol. % | 14.4 | 0.8 | 0.2 |
| $C_3$s, vol. % | 10.4 | 0.3 | 2.1 |
| $C_2$−, wt. % | 3.3 | (0.2) | — |
| Coke, wt. % | 7.1 | 0.7 | 0.7 |
| Alkylate, vol. % | 20.8 | 1.1 | 3.8 |
| G+PA, vol. % | 73.2 | (1.0) | 0.5 |
| n-$C_5$, vol. % | 0.4 | — | (0.1) |

TABLE 6-continued (70 vol. % Conversion)

| | | Δ | |
|---|---|---|---|
| Catalyst | REY | I | E |
| i-$C_5$, vol. % | 6.6 | (1.1) | (1.1) |
| $C_5$=, vol. % | 3.8 | (0.3) | (0.1) |
| n-$C_4$, vol. % | 0.8 | 0.3 | 0.1 |
| i-$C_4$, vol. % | 8.2 | — | (0.4) |
| $C_4$=, vol. % | 5.5 | 0.4 | 0.5 |
| $C_3$°, vol. % | 3.4 | 0.1 | 0.2 |
| $C_3$=, vol. % | 7.1 | 0.1 | 1.8 |
| $C_2$, wt. % | 0.6 | 0.1 | — |
| $C_2$=, wt. % | 0.8 | (0.2) | — |
| $C_1$, wt. % | 0.8 | — | (0.1) |
| $H_2$, wt. % | 0.2 | — | — |
| $H_2S$, wt. % | 0.9 | (0.1) | — |
| Octane, $C_5$+ Gasoline | 91.4 | (0.4) | 0.3 |

TABLE 7

(70 vol. % Conversion)

| Catalyst | I | E |
|---|---|---|
| Selectivity | | |
| (− Δ $C_5$+ Gasoline/Δ RON) | (4.2) | 10.7 |
| (− Δ $C_5$+ Gasoline/Δ PA) | 2.3 | 0.8 |
| $C_3$=/$C_4$= (vol. %/vol. %) | 1.2 | 1.5 |
| Δ $C_3$=/Δ $C_4$= (vol. %/vol. %) | 0.3 | 3.6 |
| $C_3$=/$C_3$° (vol. %/vol. %) | 2.1 | 2.5 |
| Δ $C_3$=/Δ ($C_3$= + $C_3$°) | 0.5 | 0.9 |
| Activity | | |
| (Δ RON/wt. % ZSM-5) | (0.3) | 0.2 |
| (Δ PA/wt. % ZSM-5) | 0.5 | 1.9 |

EXAMPLE 15

The evaluation tests of Example 14 are repeated here with Joliet Sour Heavy Gas Oil feedstock at 515° C. and 1 minute on stream. Results of these tests at 65% conversion are presented in Table 8 for the REY catalyst and Catalysts A, B, and C'. Table 9 presents selectivity and activity comparisons between the catalysts.

TABLE 8

(65 vol. % conversion)

| | | Δ | | |
|---|---|---|---|---|
| Catalyst | REY | A | B | C' |
| $C_5$+ Gasoline, vol. % | 50.6 | (2.1) | (3.1) | (6.1) |
| $C_4$s, vol. % | 14.2 | — | 1.7 | 4.0 |
| $C_3$s, vol. % | 8.7 | 1.6 | 2.5 | 4.1 |
| $C_2$−, wt. % | 2.5 | (0.1) | 0.1 | 0.5 |
| Coke, wt. % | 4.5 | 0.5 | — | (0.2) |
| Alkylate, vol. % | 23.1 | 4.0 | 5.7 | 7.8 |
| G+PA, vol. % | 73.6 | 1.9 | 2.5 | 1.7 |
| n-$C_5$, vol. % | 0.4 | (0.1) | — | (0.1) |
| i-$C_5$, vol. % | 4.1 | (0.8) | 0.5 | 0.9 |
| $C_5$=, vol. % | 3.6 | — | 1.0 | 0.8 |
| n-$C_4$, vol. % | 1.0 | — | — | — |
| i-$C_4$, vol. % | 6.2 | (0.7) | 0.4 | 2.4 |
| $C_4$=, vol. % | 7.0 | 0.7 | 1.2 | 1.6 |
| $C_3$°, vol. % | 1.8 | (0.1) | 0.3 | 1.1 |
| $C_3$=, vol. % | 6.9 | 1.7 | 2.2 | 3.0 |
| $C_2$, wt. % | 0.5 | 0.1 | — | 0.1 |
| $C_2$=, wt. % | 0.5 | (0.1) | 0.1 | 0.1 |
| $C_1$, wt. % | 0.5 | (0.1) | 0.1 | 0.1 |

TABLE 8-continued (65 vol. % conversion)

| | | Δ | | |
|---|---|---|---|---|
| Catalyst | REY | A | B | C' |
| $H_2$, wt. % | 0.2 | (0.1) | — | — |
| $H_2S$, wt. % | 0.8 | 0.1 | — | 0.2 |
| Octane, $C_5+$ Gasoline | 89.5 | — | 1.3 | 2.1 |

TABLE 9

(65 vol. % Conversion)

| Catalyst | A | B | C' |
|---|---|---|---|
| Selectivity | | | |
| $(-\Delta C_5+ \text{Gasoline}/\Delta \text{RON})$ | — | 2.4 | 2.9 |
| $(-\Delta C_5+ \text{Gasoline}/\Delta \text{PA})$ | 0.5 | 0.5 | 0.8 |
| $C_3^=/C_4^=$ (vol. %/vol. %) | 1.1 | 1.1 | 1.2 |
| $\Delta C_3^=/\Delta C_4^=$ (vol. %/vol. %) | 2.4 | 1.8 | 1.9 |
| $C_3^=/C_3^°$ (vol. %/vol. %) | 5.1 | 4.3 | 3.4 |
| $\Delta C_3^=/\Delta (C_3^= + C_3^°)$ | 1.1 | 0.9 | 0.7 |
| Activity | | | |
| ($\Delta$ RON/wt. % ZSM-5) | — | 0.7 | 1.1 |
| ($\Delta$ PA/wt. % ZSM-5) | 2.0 | 2.9 | 3.9 |

Changes and modifications in the specifically described embodiments can be carried out without departing from the scope of the invention which is intended to be limited only by the scope of the appended claims.

What is claimed is:

1. A process for converting a feedstock comprising organic compounds to conversion product which comprises contacting said feedstock at organic compound conversion conditions with a catalyst comprising an active form of a synthetic porous crystalline material, said synthetic porous crystalline material having been manufactured by the method comprising:

(i) forming a reaction mixture hydrogel having a pH of from about 10 to about 14, containing sources of alkali or alkaline earth metal (M) cations; an oxide of trivalent element (X); an oxide of tetravalent element (Y); n-propylamine directing agent (R); and water, said reaction mixture having a composition in terms of mole ratios, within the following ranges:

| $YO_2/X_2O_3$ | <40 |
|---|---|
| $H_2O/YO_2$ | 10 to 35 |
| $OH^-/YO_2$ | 0.1 to 0.3 |
| $M/YO_2$ | 0.2 to 0.6 |
| $R/YO_2$ | 0.01 to 0.6 |

(ii) maintaining the reaction mixture until crystals of ZSM-5 structure are formed, (iii) recovering the ZSM-5 crystals from the reaction mixture, (iv) ammonium exchanging the recovered ZSM-5 crystals, (v) deagglomerating the ion-exchanged crystals, (vi) slurrying a matrix material with the deagglomerated ZSM-5 crystals at a pH of from about 2 to about 12, to yield a ZSM-5/matrix material comprising from about 5 to about 80 wt. % ZSM-5 and from about 20 to about 95 wt. % matrix, (vii) drying the ZSM-5/matrix material, and (viii) converting the dried ZSM-5/matrix material to the protonic form having an Alpha Value of greater than about 30.

2. A process for converting a feedstock comprising organic compounds to conversion product which comprises contacting said feedstock at organic compound conversion conditions with a catalyst comprising crystals of ZSM-5 and matrix, said catalyst having been manufactured by the method comprising:

(i) forming a reaction mixture hydrogel having a pH of from about 10 to about 14, containing sources of alkali or alkaline earth metal (M) cations; an oxide of trivalent element (X) selected from the group consisting of aluminum, boron, iron, gallium, indium, and mixtures thereof; an oxide of tetravalent element (Y) selected from the group consisting of silicon, germanium, tin, and mixtures thereof; n-propylamine directing agent (R); and water, said reaction mixture having a composition in terms of mole ratios, within the following ranges:

| $YO_2/X_2O_3$ | <40 |
|---|---|
| $H_2O/YO_2$ | 10 to 35 |
| $OH^-/YO_2$ | 0.1 to 0.3 |
| $M/YO_2$ | 0.2 to 0.6 |
| $R/YO_2$ | 0.01 to 0.6 |

(ii) maintaining the reaction mixture until crystals of ZSM-5 structure are formed, said crystals having a formula on an anhydrous basis

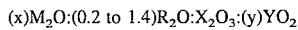

$$(x)M_2O:(0.2 \text{ to } 1.4)R_2O:X_2O_3:(y)YO_2$$

wherein x is a number greater than 0.1; and y is a number less than about 30, (iii) recovering the ZSM-5 crystals from the reaction mixture, (iv) ammonium exchanging the recovered ZSM-5 crystals, (v) deagglomerating the ion-exchanged crystals, (vi) slurrying a matrix material with the deagglomerated ZSM-5 crystals at a pH of from about 2 to about 12, to yield a ZSM-5/matrix material comprising from about 5 to about 80 wt. % ZSM-5 and from about 20 to about 95 wt. % matrix, (vii) drying the ZSM-5/matrix material, and (viii) converting the dried ZSM-5/matrix material to the protonic form having an Alpha Value of greater than about 30.

3. A process for converting a feedstock comprising organic compounds to conversion product which comprises contacting said feedstock at organic compound conversion conditions with a catalyst comprising an active form of a synthetic porous crystalline material, said synthetic porous crystalline material having been manufactured by the method comprising:

(i) forming a reaction mixture hydrogel having a pH of from about 10 to about 14, containing sources of alkali or alkaline earth metal (M) cations; an oxide of trivalent element (X); an oxide of tetravalent element (Y); n-propylamine directing agent (R); and water, said reaction mixture having a composition in terms of mole ratios, within the following ranges:

| | |
|---|---|
| $YO_2/X_2O_3$ | <40 |
| $H_2O/YO_2$ | 10 to 35 |
| $OH^-/YO_2$ | 0.1 to 0.3 |
| $M/YO_2$ | 0.2 to 0.6 |
| $R/YO_2$ | 0.01 to 0.6 |

(ii) maintaining the reaction mixture until crystals of ZSM-5 structure are formed, (iii) recovering the ZSM-5 crystals from the reaction mixture, (iv) ammonium exchanging the recovered ZSM-5 crystals, (v) deagglomerating the ion-exchanged crystals, (vi) admixing a matrix material with the deagglomerated ZSM-5 crystals to yield a ZSM-5/matrix material comprising from about 5 to about 80 wt. % ZSM-5 and from about 20 to about 95 wt. % matrix, (vii) forming the ZSM-5/matrix material by extrusion or tableting, and (viii) converting the formed ZSM-5/matrix material to the protonic form having an Alpha Value of greater than about 30.

4. The process of claim 3 wherein the process for converting a feedstock comprising organic compounds to conversion product is selected from the group consisting of (a) gasoline hydrofinishing, (b) toluene disproportionation, (c) xylene isomerization, and (d) ethylbenzene production.

5. The process of claim 4 wherein the feedstock comprises a sulfur-containing feed fraction boiling in the gasoline boiling range which process comprises:

contacting the sulfur-containing feed fraction with a hydrodesulfurization catalyst in a first reaction zone, operating under gasoline hydrofinishing conditions to produce an intermediate product comprising a gasoline boiling range fraction which has a reduced sulfur content and a reduced octane number as compared to the feed;

contacting at least the gasoline boiling range fraction of the intermediate product in a second reaction zone with the catalyst prepared according to the steps (i) through (viii) of claim 3 under octane enhancing conditions effective to convert at least part of the gasoline boiling range fraction of the intermediate product to a treated product comprising a fraction boiling in the gasoline boiling range having a higher octane number than the gasoline boiling range fraction of the intermediate product.

6. The process of claim 5 which is carried out in two stages with the first reaction zone located in the first stage, with the second reaction zone located in the second stage and with an interstage separation of light ends and heavy ends with the heavy ends fed to the second reaction zone.

7. The process of claim 5 which is carried out in a single stage with the entire effluent from the first reaction zone passed to the second reaction zone.

8. The process of claim 5 wherein the gasoline hydrofinishing conditions and the octane enhancing conditions independently comprise a temperature of about 400° F. to about 850° F., a reactor inlet pressure of about 50 psig to about 1,500 psig, a liquid hourly space velocity of about 0.5 hr$^{-1}$ to about 10 hr$^{-1}$ and a hydrogen to hydrocarbon ratio of about 500 to about 5,000 standard cubic feet of hydrogen per barrel of hydrocarbon feed.

9. The process of claim 4 wherein the feedstock comprises toluene and wherein the process comprises contacting the toluene feedstock with the catalyst prepared according to steps (i) through (viii) of claim 3 under conditions effective for disproportionation of toluene and wherein at least 40 weight percent of the toluene present in the feedstock is converted to other compounds and wherein greater than thermodynamically equilibrium amounts of para-xylene are produced.

10. The process of claim 9 wherein the preparation of the catalyst according to claim 3 further comprises silica binding the deagglomerated ZSM-5 crystals from step (v) of claim 3 by a sequence of steps comprising (a) admixing the deagglomerated crystals with a material according to step (vi) of claim 3 by mulling a mixture comprising water, the deagglomerated crystals, colloidal silica and sodium ions and extruding the mulled mixture according to step (vii) of claim 3 under conditions sufficient to form an extrudate having an intermediate green strength sufficient to resist attrition during ion exchange step (b) set forth hereinafter;

(b) contacting the uncalcined extrudate of step (a) above with an aqueous solution comprising ammonium cations under conditions sufficient to exchange cations in said synthetic porous crystalline material with ammonium cations; and (c) calcining the ammonium exchanged extrudate of step (b) above according to step (viii) of claim 3 under conditions sufficient to generate the hydrogen form of said synthetic porous crystalline material and increase the crush strength of said extrudate.

11. The process of claim 9 wherein the toluene disproportionation conditions comprise a temperature of about 500° F. to about 1,400° F., a reactor inlet pressure of about 0.1 atm to about 100 atm, a weight hourly space velocity of about 0.1 hr$^{-1}$ to about 50 hr$^{-1}$ and a hydrogen to hydrocarbon molar ratio of about 0 to about 30.

12. The process according to claim 4 wherein the feedstock comprises an aromatic $C_8$ mixture of ethylbenzene and xylenes and wherein the para-xylene concentration in the aromatic $C_8$ mixture is less than at thermal equilibrium, said process comprising contacting the feedstock, under xylene isomerization conditions, with the catalyst prepared according to steps (i) through (viii) of claim 3.

13. The process of claim 12 wherein the catalyst is silica bound by a sequence of steps comprising (a) admixing the deagglomerated ZSM-5 crystals of step (v) of claim 3 with a material according to step (vi) of claim 3 by mulling a mixture comprising water, the deagglomerated ZSM-5 crystals, colloidal silica and sodium ions and extruding the mulled mixture according to step (vii) of claim 3 under conditions sufficient to form an extrudate having an intermediate green strength sufficient to resist attrition during ion exchange step (b) set forth hereinafter;

(b) contacting the uncalcined extrudate of step (a) above with an aqueous solution comprising ammonium cations under conditions sufficient to exchange cations in the ZSM-5 crystals with ammonium cations; and (c) calcining the ammonium exchanged extrudate of step (b) above according to step (viii) of claim 3 under conditions sufficient to generate the hydrogen form of ZSM-5 and increase the crush strength of the extrudate.

14. The process according to claim 4 wherein the feedstock comprises benzene and wherein the process comprises alkylating benzene with ethylene in the presence of the catalyst prepared according to steps (i) through (viii) of claim 3 under conditions effective for ethylbenzene production.

15. The process according to claim 14 wherein the ethylbenzene production conditions comprise a temperature of about 300° F. to about 900° F., a pressure of atmospheric to about 3,000 psig, an ethylene weight hourly space velocity of about 0 1 hr$^{-1}$ to about 10 hr$^{-1}$, and a benzene to ethylene molar ratio in the feed of about 1:1 to about 30:1 (benzene to ethylene).

16. The process according to claim 14 wherein the ethylbenzene production conditions comprise a vapor-phase reaction of benzene with ethylene at a temperature of about 575° F. to about 900° F., a pressure of about 50 psig to about 500 psig, an ethylene weight hourly space velocity of about 1 hr$^{-1}$ to about 10 hr$^{-1}$, and a benzene to ethylene molar ratio in the feed of about 1:1 to about 30:1 (benzene to ethylene).

* * * * *